United States Patent [19]

Münzmay et al.

[11] Patent Number: 5,635,542
[45] Date of Patent: Jun. 3, 1997

[54] PROCESS FOR THE PRODUCTION OF HYDROXYL-GROUP-CONTAINING COMPOUNDS FROM POLYURETHANE POLYUREA AND/OR POLYUREA WASTES

[75] Inventors: Thomas Münzmay, Dormagen; Werner Rasshofer, Köln; Walter Meckel, Neuss, all of Germany

[73] Assignee: Bayer Aktiengesellschaft, Leverkusen, Germany

[21] Appl. No.: 492,206

[22] Filed: Jun. 16, 1995

[30] Foreign Application Priority Data

Jun. 23, 1994 [DE] Germany ............... 44 21 902.4

[51] Int. Cl.$^6$ .................. C08J 11/24; C07C 29/128
[52] U.S. Cl. .................. 521/49.5; 521/47; 525/452; 525/453; 525/454; 525/459; 560/24; 560/25; 560/26; 560/115; 560/157; 560/158; 564/32; 568/700; 568/852; 568/853; 568/854; 568/858; 568/868; 568/877
[58] Field of Search .................. 521/49, 49.5; 525/452, 525/453, 454, 459; 568/700, 852, 853, 858, 877, 854, 868; 560/24, 25, 26, 115, 157, 158; 564/32

[56] References Cited

U.S. PATENT DOCUMENTS

| | | | |
|---|---|---|---|
| 4,218,543 | 8/1980 | Weber et al. | 521/51 |
| 4,311,800 | 1/1982 | Reischl | 521/109 |
| 4,339,358 | 7/1982 | Schütz | 521/49.5 |
| 5,104,932 | 4/1992 | Dawans | 525/408 |
| 5,338,763 | 8/1994 | Munzmay et al. | 521/49.5 |
| 5,410,008 | 4/1995 | Bauer | 528/61 |
| 5,508,312 | 4/1996 | Münzmay et al. | 521/49.5 |

FOREIGN PATENT DOCUMENTS

| | | |
|---|---|---|
| 2114873 | 8/1994 | Canada. |
| 537579 | 4/1993 | European Pat. Off. |
| 4116700 | 1/1993 | Germany. |

OTHER PUBLICATIONS

B. Naber: "Recycling von Polyurethanen (PUR)" [Polyurethane (PUR) Recycling], Kunststoffrecycling-Tagung der TU Berlin [Symposium on Plastics Recycling, Berlin Technical University], Jan. 10,1991.

W. Thoma & H. Genth, Medizin und Chemie [Medicine & Chemistry] 7, 793–801 (1963) Verlag Cheimie, Weinheim a.d. Bergstrasse.

H. Glaser in Houben–Weyl: Methoden der Organischen Chemie [Organic Chemistry Methods], Nov. 1, Stuttagart (1957).

*Primary Examiner*—Rabon Sergent
*Attorney, Agent, or Firm*—Joseph C. Gil; Lyndanne M. Whalen

[57] ABSTRACT

The present invention relates to a process for the production of hydroxyl-group-containing compounds suitable for the polyisocyanate polyaddition process from polyurea and/or polyurethane polyurea wastes by treating polyurea and/or polyurethane polyurea wastes with diols and/or polyols at temperatures from 160° to 260° C., the water present in the reaction vessel preferably being removed by distillation during the heating-up phase, characterized in that 1,3-dicarbonyl compounds are added to the reaction mixture before or during the reaction.

2 Claims, No Drawings

PROCESS FOR THE PRODUCTION OF HYDROXYL-GROUP-CONTAINING COMPOUNDS FROM POLYURETHANE POLYUREA AND/OR POLYUREA WASTES

The invention relates to a process for the production of hydroxyl-group-containing compounds suitable for the polyisocyanate polyaddition process from polyurethane polyurea and/or polyurea wastes by decomposing these plastics by alcoholysis and reacting the alcoholysates to reduce their content of low molecular weight, sterically unhindered, aromatic amines.

The alcoholytic decomposition of plastics produced by the polyisocyanate polyaddition process is known in principle. No solution has however been found to the problem of decomposing polyurethanepolyurea or polyurea wastes by alcoholysis with the recovery of usable alcoholysates, or in particular to the problem of working up plastics which have been produced using polyisocyanate mixtures of the diphenylmethane series and aromatic diamines as chain-extending agents, i.e. polyurethane wastes with a high content of urea groups.

Glycolysates of polyurethane polyurea or polyurea wastes containing or rich in urea groups are distinguished by a relatively high content of low molecular weight primary aromatic amines, and in particular sterically unhindered primary aromatic amines [B. Naber: "Recycling von Polyurethanen (PUR)" ("Polyurethane Recycling"), Kunststoffrecycling-Tagung der TU Berlin, (Symposium on Plastics Recycling, Berlin Technical University), 1.101.1991].

This can considerably impair the reusability of such glycolysates in the isocyanate polyaddition process. Due to the high reactivity of low molecular weight primary aromatic amines a high content thereof has a negative effect on the processibility of such glycosylates, such as for example in the reaction injection-moulding process (RIM). This is manifested for example by excessively short flow paths, which make it impossible to fill intricate moulds.

In addition, an excessively high content of low molecular weight primary aromatic amines, in particular sterically unhindered primary aromatic amines, can interfere with the polymer structure to such an extent that products with a poor property profile are obtained (high glass transition temperature, low ultimate strength and percentage elongation at break).

The object of the invention was therefore to provide a new process for the production of hydroxyl-group-containing compounds having either no content or an at least greatly reduced content of low molecular weight sterically unhindered primary aromatic amines from polyurethane polyurea or polyurea wastes by alcoholytic decomposition.

This object is achieved by the process described in more detail in the following.

The present invention therefore relates to a process for the production of hydroxyl-group-containing compounds suitable for the polyisocyanate polyaddition process from polyurethane polyurea and/or polyurea wastes by treating polyurethane polyurea and/or polyurea wastes with diols and/or polyols at temperatures from 160° to 260° C., preferably 160° to 240° C., the water present in the reaction vessel being removed by distillation preferably during the heating-up phase, characterised in that 1,3-dicarbonyl compounds are added to the reaction mixture before or during the alcoholysis reaction.

The quantity of 1,3-dicarbonyl compounds added to the reaction mixture is generally 0.5 to 30, preferably 1 to 20, and in particular 1 to 10% by weight, based on the total mixture of polyurethane polyureas and/or polyurea wastes.

It is of course also possible to use appropriate catalysts to complete or accelerate the reaction.

Suitable catalysts are protonic acids, such as for example chloroacetic acid, trichloroacetic acid, trifluoroacetic acid, p-toluenesulphonic acid, methanesulphonic acid, sulphuric acid or phosphoric acid, or Lewis acids, such as for example boron trifluoride, tin dichloride or iron(III) chloride. Aminic catalysts, preferably tertiary amines, can also be used. The catalysts are normally used in quantities of 0.001 to 10% by weight, preferably 0.01 to 2% by weight, based on the total weight of the reaction mixture.

The alcoholysis reaction can be carried out by methods known per se, by reacting coarsely ground or finely comminuted polyurethane polyurea and/or polyurea wastes (preferably after dehydrating the mixture at temperatures in the range from 60° to 220° C.) at temperatures from 160° to 260° C. with diols and/or polyols in a ratio by weight of waste:diols and/or polyols of 10:1 to 1:100, preferably 10:1 to 1:20, and most preferably 5:1 to 1:3.

Suitable diols and/or polyols are for example ethylene glycol, diethylene glycol and higher condensates, 1,2-propylene glycol, dipropylene glycol and higher condensates, hexanediol, glycerol, trimethylolpropane, and ethoxylation and/or propoxylation products thereof. The diols and/or polyols used in excess can optionally partially be removed by distillation from the hydroxyl-group-containing decomposition products after the alcoholytic decomposition reaction.

It is also possible for macroglycols of a molecular weight range of >350—of the kind known per se in polyurethane chemistry—to be added to the alcoholysis products before, during or after the alcoholytic decomposition reaction, in order to adjust the viscosity.

Suitable 1,3-dicarbonyl compounds are for example 1,3-diketones, such as pentane-2,4-dione, dimedone, or β-ketocarboxylic acid derivatives, such as for example the esterification products of acetoacetic acid with mono-, di- or polyols, such as methanol, ethanol, propanol, butanol, ethanediol, 1,2-propanediol, 1,4-butanediol, 1,6-hexanediol, glycerol, trimethylolpropane, trimethylolethane or pentaerythritol. Particularly preferred esterification products are those of acetoacetic acid with mono- and diols of the above-mentioned kind.

In order to complete the reaction it can also be advantageous to remove the water formed during the reaction from the reaction mixture, for example by distillation.

It has now surprisingly been found that the content of undesirable amines can be reduced by the process according to the invention to such an extent that valuable products can be obtained which can be excellently reused as reactants with polyisocyanates in the polyisocyanate polyaddition process.

In the examples below, which are intended to illustrate the invention, the following starting materials and/or alcoholysis products are used, the meanings of the symbols used being as follows:

| OH–Z hydroxyl number | [mg KOH/g] |
|---|---|
| NH–Z amine number | [mg KOH/g] |
| S–Z acid number | [mg KOH/g] |

Polyretahne urea A1

A granulate of a maximum particle size of 8 mm consisting of a glass-fibre-reinforced polyurethane polyurea of a density of 1.26 g/cm³ and produced as described in Example 2 of DE-PS 2,622 951 (100 parts by weight of a polyol mixture consisting of

| 87% by weight | of a polyether of an OH number of 28 obtained by the addition of propylene oxide and the subsequent addition of ethylene oxide to trimethylolpropane, |
|---|---|
| 13% by weight | of a mixture of 65 parts by weight of 1-methyl-3,5-diethylphenylene-2,4-diamine and 35 parts by weight of 1-methyl-3,5-diethylphenylene-2,6-diamine, |
| 0.06% by weight | of a complex of 1 mol of dibutyltin dilaurate and 1 mol of 2,3-dimethyl-3,4,5,6-tetrahydropyrimidine, | are processed in a reaction injection-moulding machine in the presence of 100 parts by weight of a polyisocyanate mixture consisting of 30% by weight of a partially carbodiimidised 4,4'-diphenylmethanediisocyanate having an isocyanate content of 30% by weight and 70% by weight of pure 4,4'-diphenylmethanediisocyanate, and discharged into the required moulds).

EXAMPLE 1

Glycolysate G1

8 kg of diethylene glycol are initially introduced into a 20 l flat-flange-jointed vessel equipped with a stirrer and a heating jacket, a nitrogen blanket is applied and the mixture is preheated to 220° C. 8 kg of A1 are introduced under a nitrogen blanket into the hot glycol in such portions that a stirrable mixture is present at all times. When the addition of A1 is complete 800 g of ethyl acetoacetate are added at about 200° C. After an additional 90 minutes reaction time a liquid product is obtained with the following data:

OH—$Z=450$

NH—$Z=37$

S—$Z=0.12$ sterically hindered primary aromatic diamine: 0.35% by weight sterically unhindered primary aromatic diamine: <0.1% by weight.

EXAMPLE 2

Glycolysate G2

8 kg of diethylene glycol and 0.800 kg of ethyl acetoacetate are initially introduced into a 20 l flat-flange-jointed vessel equipped with a stirrer and a heating jacket, a blanket of nitrogen is applied and the mixture is heated to 220° C. 8 kg of A1 are introduced into the hot mixture under a nitrogen blanket in such portions that a stirrable mixture is present at all times. When the addition of A1 is complete the mixture is subsequently stirred for 90 minutes at about 200° to 210° C. A liquid product is obtained with the following data:

OH—$Z=353$

NH—$Z=33$

S—$Z=0.07$ sterically hindered primary aromatic diamine: 0.29% by weight sterically unhindered primary aromatic diamine: <0.1% by weight.

We claim:

1. Process for the production of hydroxyl-group-containing compounds suitable for the polyisocyanate polyaddition process from polyurethane polyurea and/or polyurea wastes by treating polyurethane polyurea and/or polyurea wastes with diols and/or polyols at temperatures from 160° to 260° C. in amounts such that the weight ratio of polyurethane polyurea and/or polyurea waste to diols and/or polyols is 10:1 to 1:100, any water present in the reaction vessel being removed by distillation optionally during the heating-up phase, characterised in that 1,3-dicarbonyl compounds are added to the reaction mixture before or during reaction of the wastes with the diols and/or polyols.

2. Process according to claim 1, characterised in that the 1,3-dicarbonyl compounds are used in a quantity of 0.5 to 30% by weight, based on the total mixture of polyurethane polyurea and/or polyurea wastes.

\* \* \* \* \*